United States Patent
Pateel et al.

(10) Patent No.: US 11,636,518 B2
(45) Date of Patent: Apr. 25, 2023

(54) APPARATUS AND METHODS FOR ADAPTIVE SIGNAGE

(71) Applicant: AT&T Intellectual Property I, L.P., Atlanta, GA (US)

(72) Inventors: Pramod Pateel, Suwanee, GA (US); William Shaw, Kennesaw, GA (US); Timothy Barge, Buford, GA (US); Bryan Corbin, Alpharetta, GA (US); Robert Tuttle, Cumming, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 17/511,748

(22) Filed: Oct. 27, 2021

(65) Prior Publication Data

US 2022/0051291 A1     Feb. 17, 2022

Related U.S. Application Data

(63) Continuation of application No. 15/830,192, filed on Dec. 4, 2017, now Pat. No. 11,188,944.

(51) Int. Cl.
    *G06Q 30/00*     (2012.01)
    *G06Q 30/0251*     (2023.01)
    (Continued)

(52) U.S. Cl.
    CPC ... *G06Q 30/0261* (2013.01); *G06F 16/24575* (2019.01); *G06Q 30/0267* (2013.01);
    (Continued)

(58) Field of Classification Search
None
See application file for complete search history.

(56) References Cited

U.S. PATENT DOCUMENTS

| 4,670,798 A | 6/1987 | Campbell et al. |
|---|---|---|
| 6,536,658 B1 | 3/2003 | Rantze et al. |

(Continued)

FOREIGN PATENT DOCUMENTS

| WO | 20080138144 | 11/2008 | |
|---|---|---|---|
| WO | WO-2016103287 A1 * | 6/2016 | ............. G06Q 30/02 |

OTHER PUBLICATIONS

Yamamoto, Hirotsugu, et al. "Viewing-zone control of large full-color LED display for 3-D and digital signage." 2009 IEEE Industry Applications Society Annual Meeting. IEEE, 2009. (Year: 2009).*

(Continued)

*Primary Examiner* — Michael Bekerman
(74) *Attorney, Agent, or Firm* — Guntin & Gust, PLC; Douglas Schnabel

(57) ABSTRACT

Aspects of the subject disclosure may include, for example, a machine-readable storage medium that includes executable instructions that, when executed by a processing system, facilitate performance of operations which include modifying advertising content at a display responsive to a person being determined to be in a first zone relative to the display, determining a presence of a communication device of the person, wherein the second zone is closer in range to the display than the first zone, transmitting a query to the communication device, receiving from the communication device the identifying characteristic of the person, obtaining an image of the person responsive to the person being determined to be in a third zone relative to the display, wherein the third zone is closer in range to the display than the first zone and the second zone, and obtaining modified content for the person based on the identifying characteristic.

20 Claims, 6 Drawing Sheets

(51) Int. Cl.
  *G06F 16/2457* (2019.01)
  *G06T 7/70* (2017.01)
  *G01S 15/88* (2006.01)
  *H04N 5/33* (2023.01)
  *G06T 3/40* (2006.01)
  *G01S 17/88* (2006.01)
  *G06V 40/20* (2022.01)
  *G06V 20/52* (2022.01)

(52) U.S. Cl.
  CPC ......... *G06Q 30/0269* (2013.01); *G06T 7/70* (2017.01); *G01S 15/88* (2013.01); *G01S 17/88* (2013.01); *G06T 3/40* (2013.01); *G06V 20/52* (2022.01); *G06V 40/20* (2022.01); *H04N 5/33* (2013.01)

(56) References Cited

U.S. PATENT DOCUMENTS

| | | | |
|---|---|---|---|
| 7,024,180 B2 | 4/2006 | Waters et al. | |
| 8,421,782 B2 | 4/2013 | Sakata et al. | |
| 9,047,256 B2 | 6/2015 | Carlson et al. | |
| 9,460,453 B2 | 10/2016 | Rider et al. | |
| 9,524,584 B2 | 12/2016 | Rodriguez et al. | |
| 9,582,805 B2 | 2/2017 | Jung et al. | |
| 9,785,972 B2 | 10/2017 | Raman et al. | |
| 2002/0046100 A1* | 4/2002 | Kinjo | G09G 5/00 705/14.66 |
| 2004/0044564 A1 | 3/2004 | Dietz et al. | |
| 2005/0197923 A1 | 9/2005 | Kilner et al. | |
| 2010/0299210 A1 | 11/2010 | Giraud et al. | |
| 2011/0150283 A1 | 6/2011 | Kim et al. | |
| 2011/0161160 A1 | 6/2011 | Carlson et al. | |
| 2011/0279479 A1 | 11/2011 | Rodriguez | |
| 2012/0287044 A1 | 11/2012 | Bell et al. | |
| 2013/0054377 A1 | 2/2013 | Krahnstoever et al. | |
| 2014/0012674 A1 | 1/2014 | Piccionielli et al. | |
| 2014/0032327 A1* | 1/2014 | Prakash | G06Q 30/0251 705/14.66 |
| 2014/0058834 A1* | 2/2014 | Liberty | G06Q 30/0225 705/65 |
| 2014/0236728 A1 | 8/2014 | Wright et al. | |
| 2015/0088661 A1* | 3/2015 | Bhaumik | G06Q 30/0269 705/14.66 |
| 2015/0381689 A1 | 12/2015 | Ganesh et al. | |
| 2016/0132726 A1 | 5/2016 | Kempinski et al. | |
| 2017/0255961 A1 | 9/2017 | Parekh | |
| 2018/0060920 A1 | 3/2018 | Beaven et al. | |
| 2018/0125404 A1* | 5/2018 | Bott | G06F 3/013 |
| 2018/0181995 A1* | 6/2018 | Burry | H04N 7/18 |
| 2018/0239136 A1 | 8/2018 | Ishikawa et al. | |
| 2018/0357981 A1 | 12/2018 | Ng et al. | |
| 2019/0019218 A1* | 1/2019 | Thompson | H04N 13/398 |
| 2019/0108551 A1* | 4/2019 | Chow | G06V 10/56 |
| 2019/0172091 A1 | 6/2019 | Pateel et al. | |

OTHER PUBLICATIONS

Dipert, Brian et al., "Practical Computer Vision Enables Digital Signage with Audience Perception", Frontline Technology, 2014, 7 pages.

Satoh, Ichiro , "A Framework for Context-Aware Digital Signage", National Institute of Informatics, AMT 2011, LNCS 6890, pp. 251-262, 2011, 12 pages.

Tamaki, Nozomi et al., "Synchronizing Digital Signage Content with the Movement of Passerby", VINCI'15, Aug. 24-26, 2015.

Yoshimura, Hiroki et al., "Appearance-Based Gaze Estimation for Digital Signage Considering Head Pose", International Journal of Machine Learning and Computing, vol. 5, No. 6, Dec. 2015, 5 pages.

* cited by examiner

100

200

APPARATUS AND METHODS FOR ADAPTIVE SIGNAGE

CROSS REFERENCE TO RELATED APPLICATIONS

This application is a continuation of U.S. patent application Ser. No. 15/830,192 filed on Dec. 4, 2017. All sections of the aforementioned application are incorporated herein by reference in its entirety.

FIELD OF THE DISCLOSURE

The subject disclosure relates to an adaptive sign that displays custom and adaptive media content.

BACKGROUND

Public advertising, such as billboards and monitors, typically display static content. Static content is generally in the form of still images, which may periodically change in billboards with monitors or mechanical systems that can change the billboard content. Such static content may not be effective in targeting users who may not be interested in the content of the advertisement.

BRIEF DESCRIPTION OF THE DRAWINGS

Reference will now be made to the accompanying drawings, which are not necessarily drawn to scale, and wherein.

DETAILED DESCRIPTION

Figure 1:
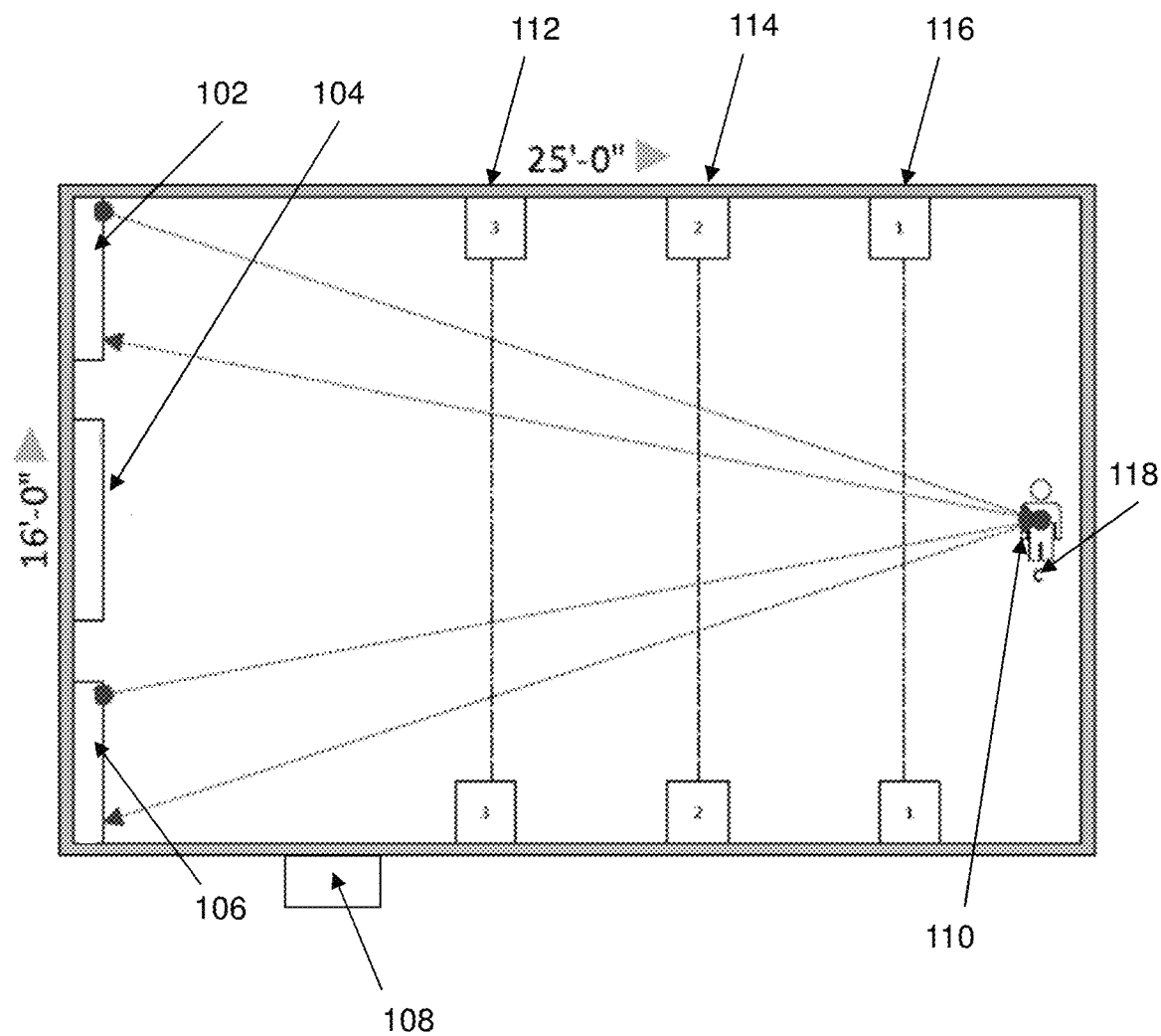
FIG. 1 depicts an illustrative embodiment of system 100.

The subject disclosure describes, among other things, illustrative embodiments for adapting signs to provide custom advertising to approaching viewers. Other embodiments are described in the subject disclosure.

One or more aspects of the subject disclosure include a device that includes a processing system and a memory, wherein the device performs operations that include displaying advertising content on a display device, determining, via a first sensor, a first distance of a person from the display device, modifying an image on the display device responsive to the person being determined to be in a first zone based on the first distance, determining a presence of a communication device utilized by the person responsive to the person being determined to be in a second zone based on a first change of the first distance to a second distance between the person and the display, wherein the second zone is at the second distance, and wherein the second distance is closer to the display device than the first distance, querying the communication device to determine an identity of the person, wherein the communication device provides an identifying characteristic of the person responsive to the querying, observing, via a second sensor, an image of the person responsive to the person being determined to be in a third zone based on a second change of the second distance to a third distance between the person and the display, wherein the third zone is at the third distance, and wherein the third distance is closer to the display device than the first distance and the second distance, determining a profile of the person based on the image of the person and according to the identifying characteristic, and presenting an altered image in the display device based on the profile of the person while the person is in the third zone.

One or more aspects of the subject disclosure include method that includes providing, by a processing system including a processor, advertising content to be displayed on a monitor, receiving, by the processing system via a first sensor, a first indication of a person being in a first zone, providing, by the processing system, an instruction to modify the advertising content on the monitor, as modified advertising content, responsive to the person being determined to be in the first zone, receiving, by the processing system, a second indication of the person being in a second zone, determining, by the processing system, a presence of a communication device of the person responsive to the second indication, wherein the second zone is in closer proximity to the monitor than the first zone, sending, by the processing system, a query to the communication device to determine an identifying characteristic of the person, receiving, by the processing system, from communication device the identifying characteristic of the person, receiving, by the processing system, an image of the person responsive to the person being determined to be in a third zone, wherein the third zone is closer to the monitor than the first zone and the second zone, determining, by the processing system, a profile of the person based on the identifying characteristic and based on the image of the person, and causing, by the processing system, the monitor to display an altered image in the monitor based on the profile of the person.

One or more aspects of the subject disclosure include a machine-readable storage medium, including executable instructions that, when executed by a processing system including a processor, facilitate performance of operations that include modifying advertising content at a display, as modified advertising content, responsive to a person being determined to be in a first zone relative to the display, determining a presence of a communication device of the person responsive to determining that the person is in a second zone relative to the display, wherein the second zone is closer in range to the display than the first zone, transmitting a query to the communication device to determine an identifying characteristic of the person, receiving from the communication device the identifying characteristic of the person, obtaining an image of the person responsive to the person being determined to be in a third zone relative to the display, wherein the third zone is closer in range to the display than the first zone and the second zone, obtaining modified content for the person based on the identifying characteristic, and presenting the modified content at the display.

FIG. 1 depicts an illustrative embodiment of a system 100 provided in a premises. The premises can exemplarily be a public concourse of a shopping area. The premises can exemplarily include an area in an interior of a store or other public venue. Exemplarily, the premises can include a monitor 104. The monitor 104 can be a display device configured to provide advertising content related to a merchant, store, or other advertiser. Exemplarily, the advertising content can be related to the merchants or stores on or near the premises as well as other unrelated business concerns.

Exemplarily, the system 100 can include various sensors to determine the presence of persons 110 within a proximity of the monitor 104. Throughout the description of the various embodiments, the terms customers, consumers, and persons can be used interchangeably. Exemplarily, the proximity of the persons 110, whether alone or in groups, can be determined according to various sensors exemplarily provided around the monitor 104 in the premises. In some embodiments, a first zone 116 can be an outermost zone. In the first zone, the person can be determined to be in an area of the premises at which the monitor 104 can be observed, but not close enough for most people to grasp finer details of a message provided on the monitor 104. In some embodiments, a second zone 114 can be an area of the premises closer to the monitor 104. Exemplarily, the second zone 114 can be an area of which a person 110 can be considered to show some interest in the subject matter provided on the monitor.

Exemplarily, a third zone 112 can be defined by an area of the premises in close proximity to the monitor 104 so as to show an interest by the person 110 that includes close reading and observing of the monitor 104. Exemplarily, when a person 110 is in the third zone 112, the monitor 104 can provide personalized content to the person 110. In other embodiments, while in the third zone 112, the sensors can be utilized to provide an interaction with the monitor based on the gestures or a viewing direction of the person relative to a viewing area of the monitor 104. In yet other embodiments, an audio system can provide verbal interactions between content shown in the monitor 104 and the person. In addition, the monitor 104 can include a touch sensitive interface which can provide additional interaction with the person.

In some embodiments, a suite of sensors can be provided in the premises to detect and interact with the person 110 as the person nears or interacts with the monitor 104. Exemplarily, the sensors can include a sonar device 106. Exemplarily, the sonar device 106 can be employed to detect persons 110 within a proximity of the monitor 104. In some embodiments, the sonar device 106 can determine a distance of the person to be within at least the first zone 116 as well as determining the distance of the person 110 as the person enters the second zone 114 and the third zone 112.

Exemplarily, the suite of sensors can further include a camera or an imaging device 102, including, for example, a Kinect™ camera device. The camera device 102 can exemplarily be used with or in place of the sonar device 106 to detect or approximate a distance of the person 110 from the monitor 104 in the premises. In additional embodiments, the camera device 102 can be used to observe the behavior of the person 110 while in the third zone 112. Exemplarily, the camera device 112 can be used to observe the gestures and eye movements, including the directions of view of the person 110 in relation to a viewing area of the monitor 104.

Exemplarily, the suite of sensors can include a wireless communication device 108 provided at the premises. In some embodiments, the wireless communication device 108 can employ a local wireless access protocol, such as WiFi or Bluetooth. In other embodiments, the wireless communication device 108 can be a cellular communications device. Exemplarily, the wireless communication device 108 can query one or more communication devices 118 that the person 110 has on his person (as illustrated by the 'c' in FIG. 1). Exemplarily, the person's mobile communication device 118 can provide a response to the wireless communication device 108 that can provide information about the person. In some embodiments, a software application may be provided to customers of the premises or to the general public which will allow the premises to query these communication devices 118 through a public wireless access point or a Bluetooth connection.

Figure 2:
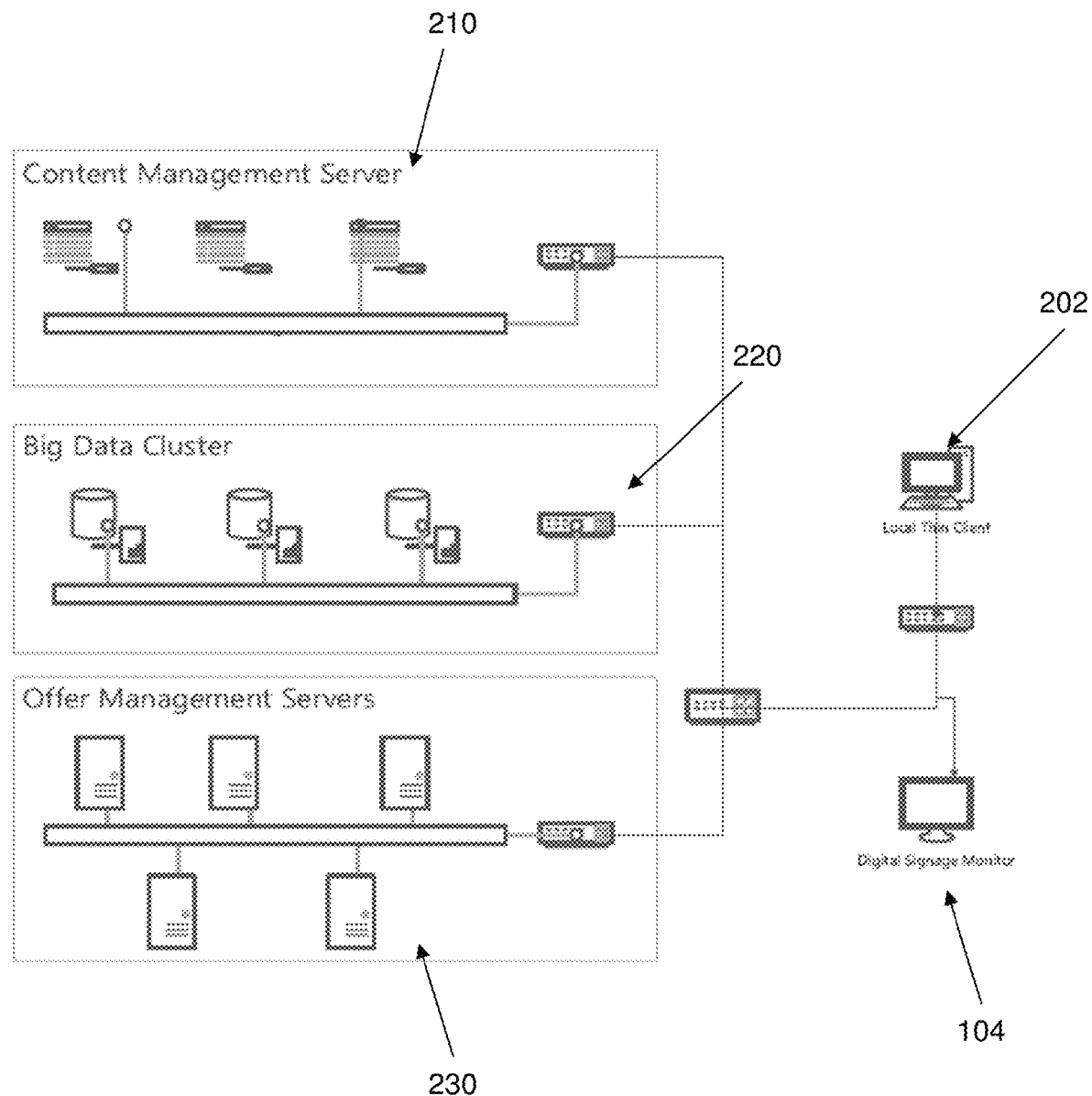
FIG. 2 depicts an illustrative embodiment of system 200.

FIG. 2 depicts an illustrative embodiment of system 200. Exemplarily, system 200 can be implemented along with system 100 so as to provide advertising content for the monitor 104 of FIGS. 1 and 2 in accordance with an advertising objective. Exemplarily, the monitor 104 can be controlled by the local client device 202. Exemplarily, the local client device 202 can also control the wireless communication device 108 of FIG. 1.

Exemplarily, the advertising objective can be provided to the local client device 202 in the form of media content to be displayed on the monitor 104. In addition, the advertising objective can include various forms of interactive media to be provided to the monitor 104 when approached by a customer 110. In addition, the advertising objective can include forms of offers or other communications to provide to the customer either through a wireless access point, an available computing device on the premises, information provided through the media content, or by having employees at the premises be summoned to answer the customer's questions or to present samples, coupons, or other items or information to the customer 110.

Exemplarily, when the suite of sensors detect a customer in a premises environment, such as the person 110 inside the premises of FIG. 1, the local client device 202 can trigger an event to initiate or provide media content to the display device 104. Exemplarily, the media content can be advertising content, entertainment content, an attention gathering display, or enhanced or altered versions of the advertising content. In one embodiment, different media content will be displayed based on a distance of the person 110 from the display device 104. Exemplarily, the content management server 210 can choose from among various types of media content to display an appropriate selection on the display device 104.

Exemplarily, the content management server 210 can manipulate the display based on the input data from the suite of sensors 102 and 106. In some embodiments, a currently displayed media content can be magnified or highlighted when the person 110 is within a distant zone from the display device 104, such as the first zone 116. Exemplarily, the media content can be highlighted to capture or attempt to engage the customer 110 from a first distance. In another embodiment, a presentation of the media content on the display device 104 can be updated to another media content selected from among a group of media content while the customer 110 is within a viewing distance of the display device 104 so as to determine a reaction to a present instance of the media content to determine which media content version generates a response from the customer 110.

Exemplarily, the camera device 102 can monitor the reactions of the customer 110 to determine which media content causes a responsive glance or gesture from the customer 110. In some embodiments, the monitoring of the customer's gestures can be used to cause the display device 104 to display other content. For example, the customer 110 may interact with the display device 104 and swipe right or left so as to initiate a command to change the subject matter of the media content on the display device 104. In other embodiments, the customer can point to certain areas of the display device 104 to cause the content management server 210 to highlight a selected viewing portion of the display device 104 or to provide or generate new content related to that selected item on the display device 104.

Exemplarily, a big data cluster 220 can be provided in system 200 to use available information regarding a customer 110 nearing or observing the display device 104 to develop or retrieve a profile for the customer 110. In some embodiments, the profile can be generated based on the information returned by the suite of sensors. For example, the camera device 102 can observe from the customer's movement, eye movements, viewing direction, and gestures an interest or lack of interest in the media content provided on the display device 104. In other embodiments, an image of the customer 110 can be recognized from previous engagements with the camera device 102 and the display device 104 based on stored images of previous customers 110.

In some embodiments, the development of the profile can be aided by the wireless communication device 108 of FIG. 1 being in contact with a mobile communications device 118 or other electronics device of the customer 110. In some embodiments, an application operating from the communication device 118 utilized by the customer 110 may be contacted by the wireless communication device 108 and in response, the application can return profile information associated with the customer 110 to the wireless communication device 108. The profile information can provide identifying characteristics of the customer 110 including, but not limited to, demographic information of the customer 110, behavioral information associated with the customer 110, psychographic information of the customer 110, among other identifying characteristics.

Exemplarily, offer management servers 230 can be utilized by the system 200 of FIG. 2. The offer management servers 230 can use the information generated from a data cluster 220 that can store banks of advertising content which can be tailored as an offer or other incentive to the customer 110 based on the profile of the customer 110. The offer may be in the form of a communication to the customer's mobile communications device 118 or an object displayed on the display device 104. In some embodiments, the offer management servers 230 may communicate with the content management server 210 to cause the display device 104 to provide a notice of an offer, a link to an offer, a barcode, a QR code, or an address of a website to receive the offer.

Exemplarily, the content management server 210 can interact with the suite of sensors, such as the camera device 102 and the sonar sensor 106 to gauge a distance of the customer 110 from the monitor 104. In some embodiments, the content management server 210 changes the media content based on the several zones that the customer 110 may be in. Exemplarily, the content management server 210 determines the media content based on the distance of the customer 110 from the monitor 104 and also on the change in the distance from the monitor 104.

For example, the content management server 210 may determine the customer 110 has approached from the first zone to the second zone but has returned to the first zone. That is, the customer 110 is determined to have approached the monitor 104 but has instead moved away from the monitor 104. The content management server 210 may interpret this movement as a lack of interest and may select media content for the monitor 104 accordingly. In some examples, the customer 110 may not approach closer than the first zone. In this instance, the content management server 210 may decide to provide an instruction to amplify the sound from the monitor 104 or to generate a larger, clear image for the customer 110 to observe. In some examples, the customer 110 may proceed directly to the third zone and view or engage interactively with the monitor 104. In response to this scenario, the content management server 210 can direct the monitor 104 to display media content according to images received by the camera device 102, so as to create an interaction with the customer 110.

Figure 3:
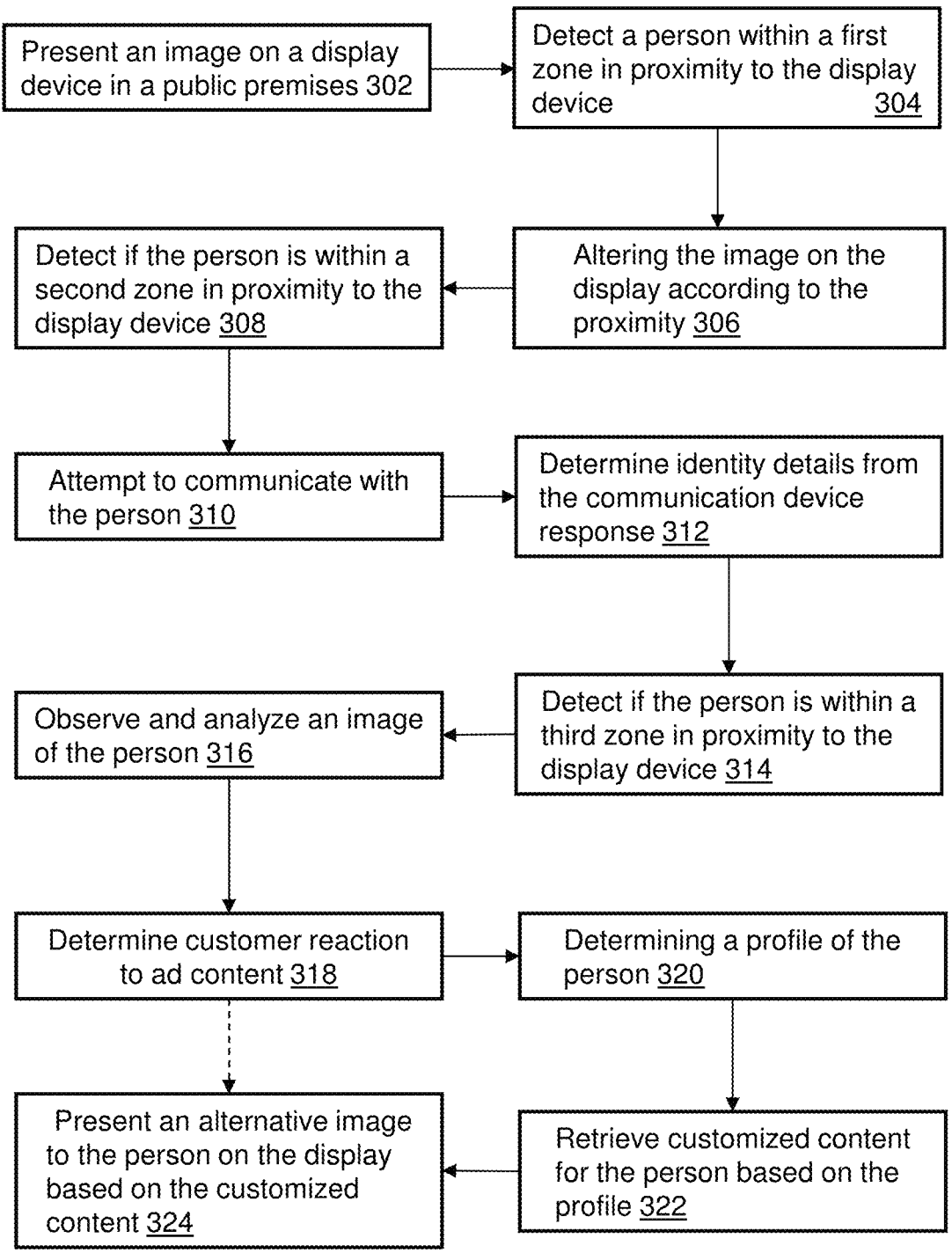
FIG. 3 depicts an illustrative embodiment of a method 300 used in portions of the system described in FIGS. 1 and 2.

FIG. 3 depicts an illustrative embodiment of a method 300 used by the embodiments of systems 100 and 200 of FIGS. 1 and 2. Exemplarily, method 300 can begin at step 302 in which a display device 104, a monitor, or a screen is provided in a venue or a premises. Exemplarily, the display device 104 is communicatively coupled to system 200 and is located in a consumer environment as illustrated in system 100 of FIG. 1. Exemplarily, the display device 104 is providing an image that is related to advertising content according to an advertising campaign or an advertising objective for the premises or venue. Exemplarily, the image being displayed can include audio and visual content of media content provided to the display device 104.

Exemplarily, while the image is displayed, the suite of sensors of FIG. 1 can be employed, such as the sonar device 106 and the camera device 102. Exemplarily, the monitor 104 and suite of sensors are provided in a premises such as a retail setting although the devices could be employed in any setting, private or public. In step 304, the sensors can detect a person or customer 110. Exemplarily, the person 110 is detected in the first zone, farthest from the display device 104. In some embodiments, the person 110 may be detected by a camera system while in other embodiments, the person 110 may be detected by a presence sensor such as a sonar or infrared detection system that detects motion, distance, and/or other presence indicators. Exemplarily, the distance of the person 110 from the monitor 104 may be continually or intermittently monitored. Responsive to detecting that the person within the first zone, the system 200 may decide to change the image presented on the display device 104 in step 306. In some embodiments, the image may be enlarged or resized based on the distance. In some embodiments, a volume of an audio portion of the media content can be increased.

Next, in step 308, the person's distance from the display device 104 can be continually monitored so as to determine that the distance between the person 110 and the display device 104 has increased, decreased, or remains substantially the same. Exemplarily, this can result in a determination that the person 110 is within a second zone which is closer in proximity to the display device 104. Once in the second zone, if it is determined that the person 110 is closing in or approaching the display device 104, in step 310, an attempt to communicate with the person 110 can be made. In one embodiment, the attempt to communicate can be a change in the image or media content on the display device 104.

In another embodiment, the attempt to communicate can be an attempt to contact a communications device 118 of the person in step 312. The person's communications device 118 can respond to an inquiry by providing information to the system 200 of FIG. 2. In some embodiments, an application may have been previously provided to the person's communication device 118 so as to respond to the query with user information that the user has previously agreed to provide in response to such queries. Exemplarily, a wireless access point provided in the premises can detect the presence of a mobile communications device 118, or other computing device, and contact the device accordingly.

Next, in step 314, the suite of sensors can detect that the customer 110 is in a third zone in proximity to the display device 104 based on the changing distance of the customer 110. Exemplarily, the third zone is closest to the display device 104 which can tend to indicate that the customer 110 may be willing to engage with the display device 104. In some embodiments, an image of the customer 110 can be analyzed to determine if a view of the customer 110 is tending towards the display device 104 or away from the display device 104 to thereby suggest a willingness to engage the display device 104.

In step 316, an image of the customer 110 can be analyzed. In some embodiments, the image can be analyzed to determine a customer profile. The customer profile can be generated based on the customer's appearance, which may provide information as to a demographic description of the customer 110. In some embodiments, the observed clothing and accessories of the customer 110, such as a watch or a type of communications device, can be used to help form a customer profile in step 320 described below. In other embodiments, the customer 110 can be recognized from stored information in a big data cluster 220. For example, an image of the customer 110 can be recognized from previous interactions. In other examples, the image of the customer 110 can be analyzed and compared to a social media presence to determine an identity of the customer 110.

Exemplarily, in the third zone, in step 318, images of the customer 110 can be acquired from the camera system 102 of FIG. 1. Exemplarily, in step 318, the customer's reactions to the ad content presented on the display device 104 can be monitored. In some embodiments, the direction of view of the customer 110 relative to a viewing area of the display device 104 can be monitored. In other embodiments, the customer's gestures can be monitored. Additionally, the eye movements of the customer 110 can be analyzed to determine which area of the media content generates an interest in the customer 110. Furthermore, the gestures of the customer 110 can be analyzed to determine if the customer 110 is interacting with the media content, such as by swiping through the various screens provided with the media content using gesture detection technology, touch screen technology integrated with the display device 104, or combinations thereof.

Exemplarily, the various information gathered about the customer 110 can be used to determine a customer profile in step 320. Exemplarily, the profile can be determined from among the behavior of the customer 110 as observed by the suite of sensors, the information obtained from the customer's mobile communications device 118, an identification based on an image of the customer 110, and observable demographic or psychographic information about the customer 110. Exemplarily, the profile can be provided to the big data cluster 220 of FIG. 2 to selectively obtain or customize advertisement content in accordance with the profile. Exemplarily, in step 322, customized or directed media content determined according to the profile of the customer 110 can be obtained and in step 324 presented on the display device 104.

In some embodiments, it can be determined that the customer 110 is moving away from the monitor 104 or has stopped approaching the monitor 104. In these exemplary situations, media content can be accessed and provided to the monitor 104 to encourage the customer 110 to return to one of the zones of the monitor 104 or to entice the customer 110 to resume his/her approach to the monitor 104.

Exemplarily, step 318 can proceed directly to step 324 in which the alternative images are provided to the display device 104 based on the customer's actions. In some embodiments, the customer 110 can engage with the display device 104 by having the camera system 102 to observe the customer's gestures. Exemplarily, the display device 104 is provided with new content based on the gestures. Thus, the customer 110 could swipe left or right or up and down so as to move images on the display device 104. In other embodiments, the eye movements or viewing direction of the customer 110 can be tracked so as to determine how to update the media content in a manner that catches the attention of the customer 110.

While for purposes of simplicity of explanation, the respective processes are shown and described as a series of blocks in FIG. 3, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
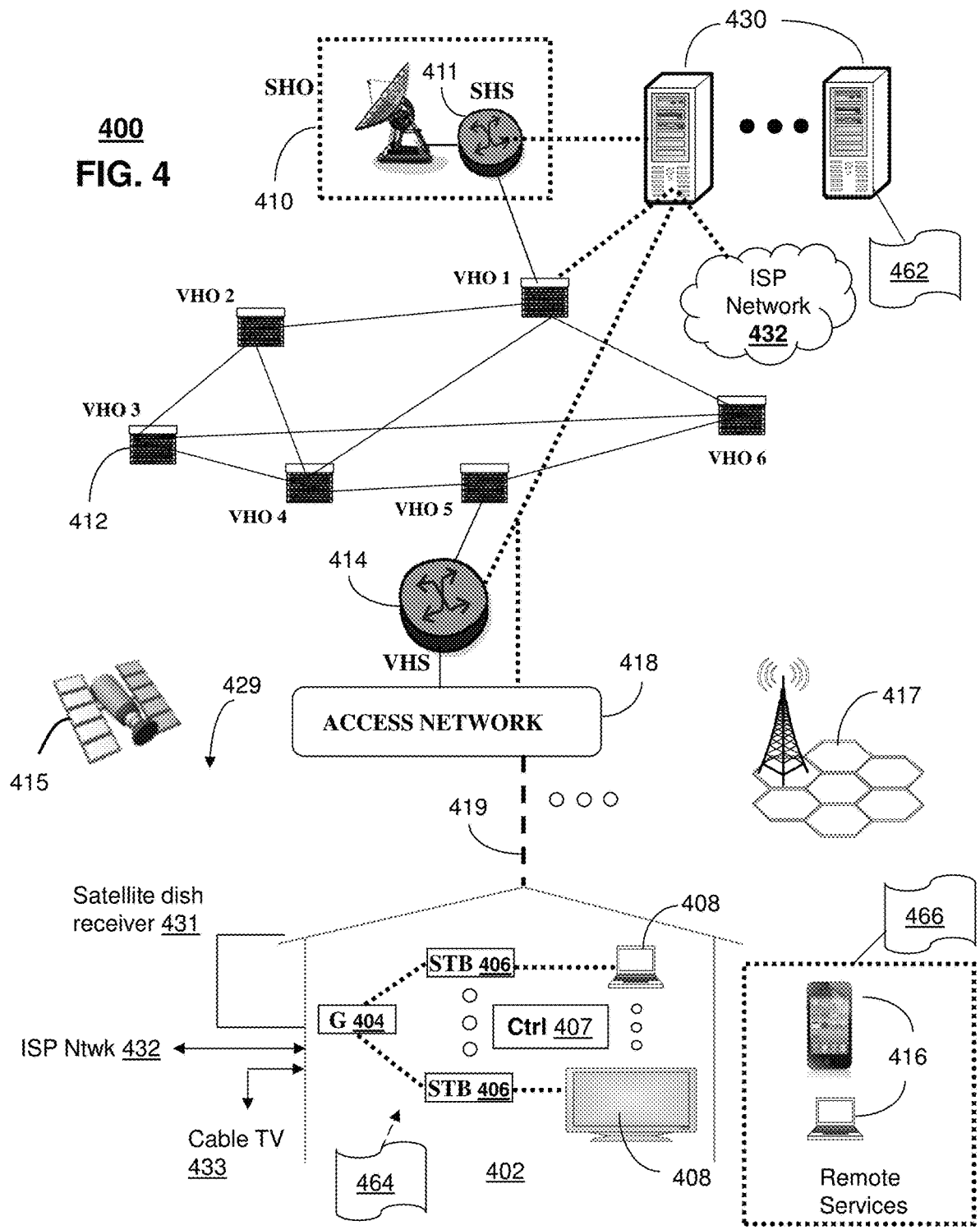
FIG. 4 depict an illustrative embodiment of communication systems that provide media services to systems 100 and 200 of FIGS. 1 and 2 and performs method 300 of FIG. 3.

FIG. 4 depicts an illustrative embodiment of a communication system 400 for providing various communication services, such as delivering media content. The communication system 400 can represent an interactive media network, such as an interactive television system (e.g., an Internet Protocol Television (IPTV) media system). Communication system 400 can be overlaid or operably coupled with systems 100 and 200 of FIGS. 1 and 2 as another representative embodiment of communication system 400. For instance, one or more devices illustrated in the communication system 400 of FIG. 4 can perform operations including displaying advertising content on a display device, determining, via a first sensor, a first distance of a person from the display device, modifying an image on the display device responsive to the person being determined to be in a first zone based on the first distance, determining a presence of a communication device utilized by the person responsive to the person being determined to be in a second zone based on a first change of the first distance to a second distance between the person and the display, wherein the second zone is at the second distance, and wherein the second distance is closer to the display device than the first distance, querying the communication device to determine an identity of the person, wherein the communication device provides an identifying characteristic of the person responsive to the querying, observing, via a second sensor, an image of the person responsive to the person being determined to be in a third zone based on a second change of the second distance to a third distance between the person and the display, wherein the third zone is at the third distance, and wherein the third distance is closer to the display device than the first distance and the second distance, determining a profile of the person based on the image of the person and according to the identifying characteristic, and presenting an altered image in the display device based on the profile of the person while the person is in the third zone.

In one or more embodiments, the communication system 400 can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS)

414 via a network of video head-end offices (VHO) 412 according to a multicast communication protocol. The VHS 414 can distribute multimedia broadcast content via an access network 418 to commercial and/or residential buildings 402 housing a gateway 404 (such as a residential or commercial gateway).

The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as an adaptive signage system (herein referred to as adaptive signage system 430). The adaptive signage system 430 can use computing and communication technology to perform function 462, which can include among other things, the providing of advertising on a display as described in method 300 of FIG. 3. For instance, function 462 of server 430 can be similar to the functions described for the content management server 210 of system 200 in FIG. 2. The media processors 406 and wireless communication devices 416 can be provisioned with software functions 464 and 466, respectively, to utilize the services of adaptive signage system 430. For instance, functions 464 and 466 of media processors 406 and wireless communication devices 416 can be similar to the functions described for the display device 104, the wireless communication device 108, and camera system 102 of FIG. 1, as well as the application provided on the persons 110 mobile communication device that provides information to the content management server 210 of system 200 in FIG. 2.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
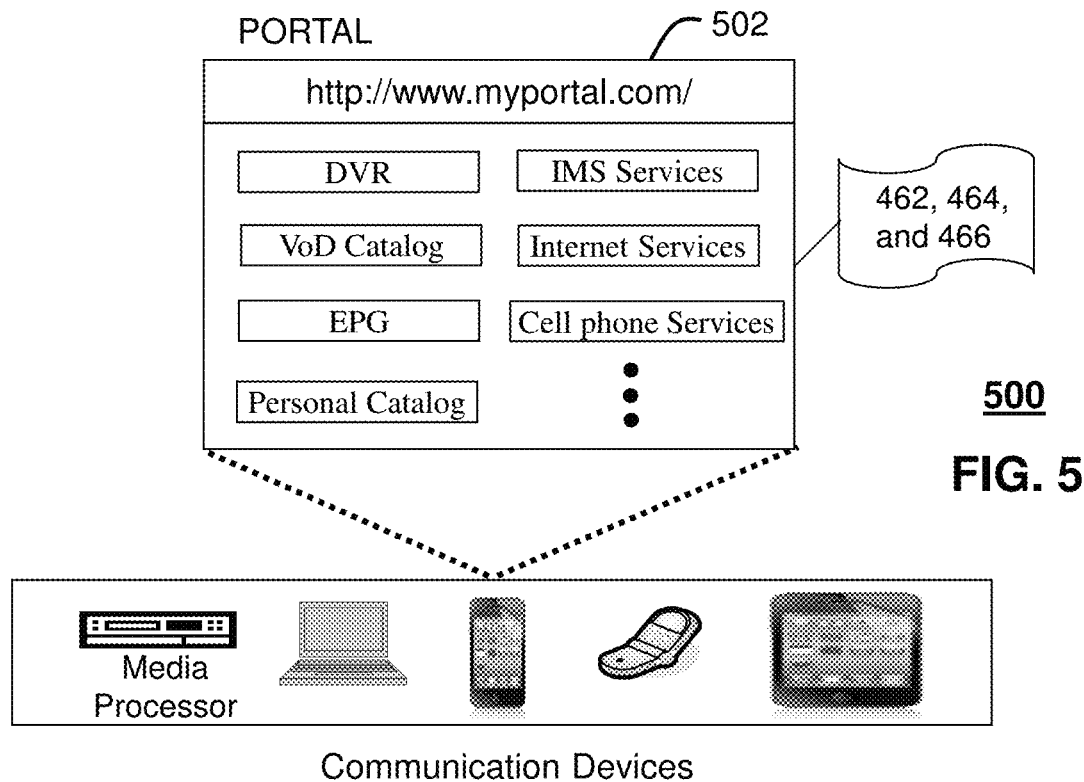
FIG. 5 depicts an illustrative embodiment of a web portal for interacting with the communication systems of systems 100 and 200 of FIGS. 1 and 2 and performs method 300 of FIG. 3.

FIG. 5 depicts an illustrative embodiment of a web portal 502 of a communication system 500. Communication system 500 can be overlaid or operably coupled with systems 100 and 200 of FIGS. 1 and 2 and communication system 400 as another representative embodiment of systems 100 and 200 of FIGS. 1 and 2, and communication system 400. The web portal 502 can be used for managing services of systems 100 and 200 of FIGS. 1 and 2 and communication systems 400. A web page of the web portal 502 can be accessed by a Uniform Resource Locator (URL) with an Internet browser using an Internet-capable communication device such as those described in FIGS. 1 and 2 and FIG. 4. The web portal 502 can be configured, for example, to access a media processor 406 and services managed thereby such as a Digital Video Recorder (DVR), a Video on Demand (VoD) catalog, an Electronic Programming Guide (EPG), or a personal catalog (such as personal videos, pictures, audio recordings, etc.) stored at the media processor 406. The web portal 502 can also be used for provisioning IMS services described earlier, provisioning Internet services, provisioning cellular phone services, and so on.

The web portal 502 can further be utilized to manage and provision software applications 464 and 466 to adapt these applications as may be desired by subscribers and/or service providers of systems 100 and 200 of FIGS. 1 and 2 and communication system 400. For instance, the operators of adaptive signage system 430 can log into their on-line accounts and provision the servers 210 or server 430 with advertising content and advertising objectives, including information about which customers to target with which advertising content. Service providers can log onto an administrator account to provision, monitor and/or maintain the systems 100 and 200 of FIGS. 1 and 2 or adaptive signage system 430.

In another embodiment, software application 466 can provide an ability to communicate between the content management server 210 of system 200 in FIG. 2 and the wireless communication device 108 of FIG. 1 with an mobile communications device of a customer so as to "ping" the customer's equipment to learn more about persons within a proximity to the display device at the premises. The software application 466 can provide an appropriate amount of information about the customer as allowed by the customer's preferences. In additional embodiments, the software application 466 can communicate with the content management server 210 or offer management servers 230 of FIG. 2 to provide offers and interactive services to the person through their mobile communications devices.

Figure 6:
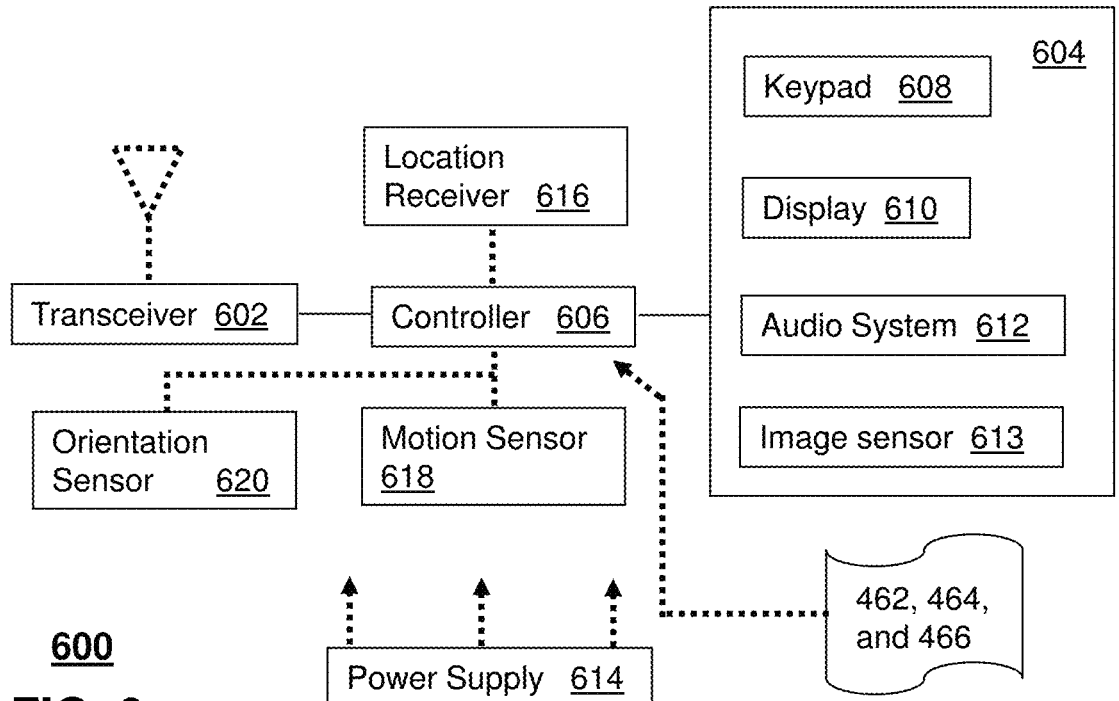
FIG. 6 depicts an illustrative embodiment of a communication device.

FIG. 6 depicts an illustrative embodiment of a communication device 600. Communication device 600 can serve in whole or in part as an illustrative embodiment of the devices depicted in FIGS. 1 and 2, and FIG. 4 and can be configured to perform portions of method 300 of FIG. 3.

Communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface with graphical user interface (GUI) elements that can be selected by a user with a touch of a finger. The touch screen display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable applications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a reset button (not shown). The reset button can be used to reset the controller 606 of the communication device 600. In yet another embodiment, the communication device 600 can also include a factory default setting button positioned, for example, below a small hole in a housing assembly of the communication device 600 to force the communication device 600 to re-establish factory settings. In this embodiment, a user can use a protruding object such as a pen or paper clip tip to reach into the hole and depress the default setting button. The communication device 600 can also include a slot for adding or removing an identity module such as a Subscriber Identity Module (SIM) card. SIM cards can be used for identifying subscriber services, executing programs, storing subscriber data, and so forth.

The communication device 600 as described herein can operate with more or less of the circuit components shown in FIG. 6. These variant embodiments can be used in one or more embodiments of the subject disclosure.

The communication device 600 can be adapted to perform the functions of display device 104, the suite of sensors, servers 210, 220, and 230, the media processor 406, the media devices 408, or the portable communication devices 416 of FIGS. 1, 2, and 4. It will be appreciated that the communication device 600 can also represent other devices that can operate in systems 100 and 200 of FIGS. 1 and 2, communication system 400 of FIG. 4 such as a gaming console and a media player. In addition, the controller 606 can be adapted in various embodiments to perform software functions 462, 464, and 466, respectively.

Upon reviewing the aforementioned embodiments, it would be evident to an artisan with ordinary skill in the art that said embodiments can be modified, reduced, or enhanced without departing from the scope of the claims described below. For example, the media content displayed on the display device can be manipulated so as to engage customers on the premises to entice them to approach and observe the display device and the advertising content displayed thereon. In some embodiments, additional sensors can be provided to inform the system of the customer's behaviors and preferences. In some embodiments, an infra-red sensor can be provided to detect the movement and distance of the persons in the premises. Additional embodiments can include various interactive features for the media content to be provided to the customer via the display device such as an interactive avatar. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 7:
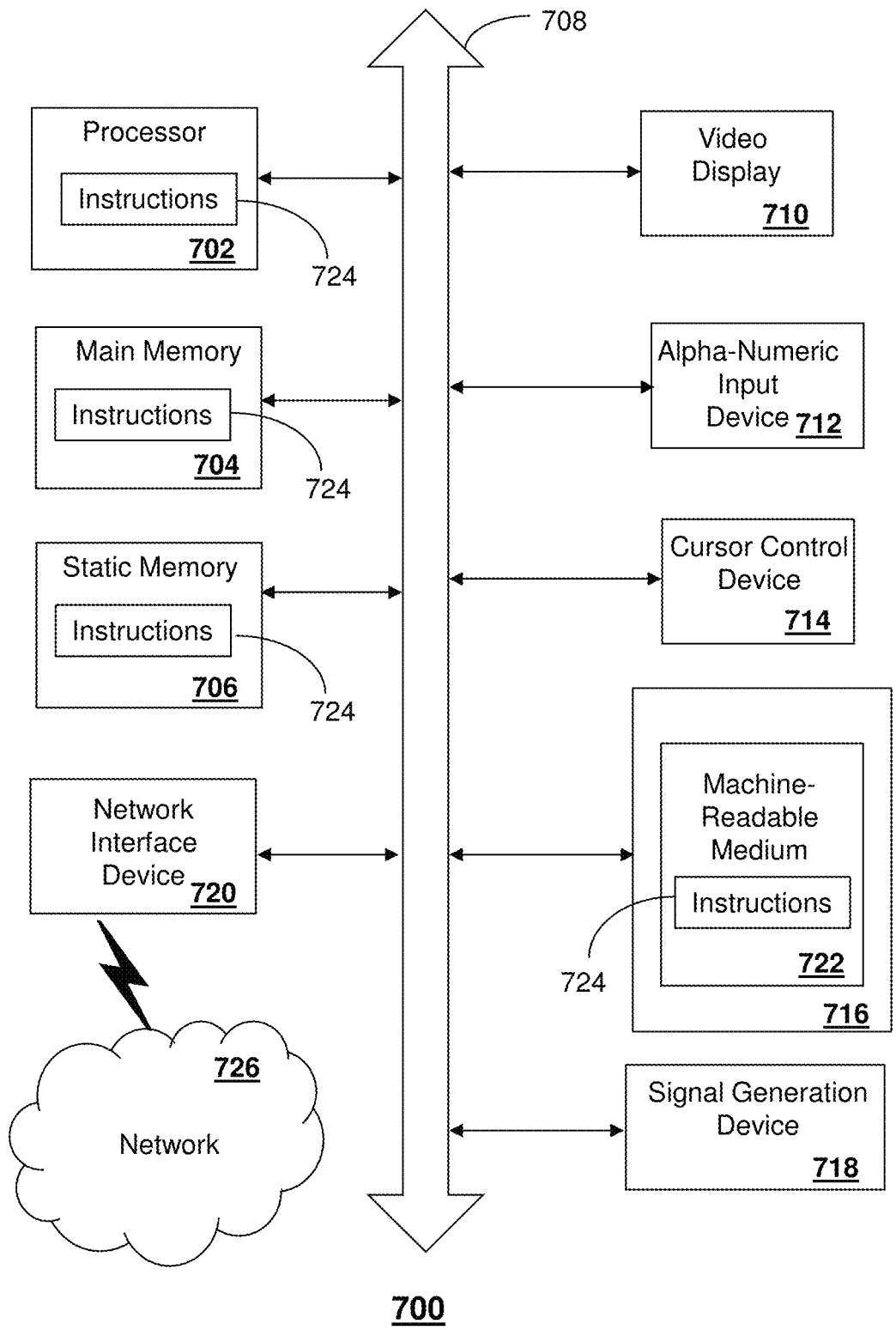
FIG. 7 is a diagrammatic representation of a machine in the form of a computer system within which a set of instructions, when executed, may cause the machine to perform any one or more of the methods described herein.

FIG. 7 depicts an exemplary diagrammatic representation of a machine in the form of a computer system 700 within which a set of instructions, when executed, may cause the machine to perform any one or more of the methods described above. One or more instances of the machine can operate, for example, as the adaptive signage system 430, the media processor 406, the content management server 210, the big data cluster 220, and offer management server 230 of system 200 in FIG. 2, as well as the suite of sensors, including camera system 102 and sonar system 106 of FIG. 1. In some embodiments, the machine may be connected (e.g., using a network 726) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 700 may include a processor (or controller) 702 (e.g., a central processing unit (CPU)), a graphics processing unit (GPU, or both), a main memory 704 and a static memory 706, which communicate with each other via a bus 708. The computer system 700 may further include a display unit 710 (e.g., a liquid crystal display (LCD), a flat panel, or a solid state display). The computer system 700 may include an input device 712 (e.g., a keyboard), a cursor control device 714 (e.g., a mouse), a disk drive unit 716, a signal generation device 718 (e.g., a speaker or remote control) and a network interface device 720. In distributed environments, the embodiments described in the subject disclosure can be adapted to utilize multiple display units 710 controlled by two or more computer systems 700. In this configuration, presentations described by the subject disclosure may in part be shown in a first of the display units 710, while the remaining portion is presented in a second of the display units 710.

The disk drive unit 716 may include a tangible computer-readable storage medium 722 on which is stored one or more sets of instructions (e.g., software 724) embodying any one or more of the methods or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 722 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 700. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
displaying advertising content on a display device on a premises;
determining, using at least one sensor of a plurality of sensors, a presence of a person on the premises;
providing a software application to a communication device of the person on the premises;
querying the software application on the communication device to determine an identity of the person, wherein the communication device provides an identifying characteristic of the person responsive to the querying;
determining, using the at least one sensor, which of a plurality of zones the person occupies on the premises, wherein the plurality of zones are defined at least in part based on distances from the display device on the premises;
capturing an image of the person;
comparing the image of the person to a plurality of previously captured images;
recognizing the person by the comparing the image of the person to the plurality of previously captured images;
determining modified advertising content responsive to the recognizing the person by the comparing the image, responsive to detecting the person moving between the plurality of zones, and responsive to the identifying characteristic of the person;
displaying a first portion of the modified advertising content on the display device;
determining a code associated with an offer, wherein the offer is tailored to the person according to the identifying characteristic of the person;
presenting the code associated with the offer on the display device; and
communicating a second portion of the modified advertising content to the communication device.

2. The device of claim 1, wherein the communicating the second portion of the modified advertising content to the communication device comprises selecting an advertising offer based on the identifying characteristic and according to an advertising objective.

3. The device of claim 1, wherein the operations further comprise:
capturing a group of images of the person while the person is viewing the modified advertising content;
determining eye movement of the person and a direction of view according to image pattern recognition applied to the group of images; and
determining an area of interest of the modified advertising content that is determined to be of interest to the person according to the eye movement and the direction of view.

4. The device of claim 1, wherein the operations further comprise;
capturing an image of the person;
determining a gesture of the person according to the image, and
wherein the displaying the first portion of the modified advertising content is responsive to the determining the gesture of the person.

5. The device of claim 1, wherein the second portion of the modified advertising content comprises interactive content that is user adjustable based on detected user gestures and an invitation for the person to utilize the communication device to contact an advertising server for further information concerning the advertising content according to an advertising objective.

6. The device of claim 1, wherein the code associated with the offer provides a link to the offer accessible via a communication network.

7. The device of claim 1, wherein the code associated with the offer is a barcode or a QR code.

8. The device of claim 1, wherein the at least one sensor comprises an infrared system.

9. The device of claim 1, wherein the determining the modified advertising content comprises enlarging the advertising content based on a distance between the person and the display device.

10. A method, comprising:
displaying, by a processing system including a processor, advertising content on a display device on a premises;
determining, by the processing system, using at least one sensor of a plurality of sensors, a presence of a person on the premises;
providing, by the processing system, a software application to a communication device of the person on the premises;
querying, by the processing system, the software application on the communication device to determine an identity of the person, wherein the communication device provides an identifying characteristic of the person responsive to the querying;
determining, by the processing system, using the at least one sensor, which of a plurality of zones the person occupies on the premises, wherein the plurality of zones are defined at least in part based on distances from the display device on the premises;
capturing, by the processing system, an image of the person;
comparing, by the processing system, the image of the person to a plurality of previously captured images;
recognizing, by the processing system, the person by the comparing the image of the person to the plurality of previously captured images;
determining, by the processing system, modified advertising content responsive to the recognizing the person by the comparing the image, responsive to detecting the person moving between the plurality of zones, and responsive to the identifying characteristic of the person;
displaying, by the processing system, a first portion of the modified advertising content on the display device;

determining, by the processing system, a code associated with an offer, wherein the offer is tailored to the person according to the identifying characteristic of the person;

presenting, by the processing system, the code associated with the offer on the display device; and communicating, by the processing system, a second portion of the modified advertising content to the communication device.

11. The method of claim 10, further comprising sending, by the processing system, an advertising offer to the communication device based on the identifying characteristic and according to an advertising objective.

12. The method of claim 10, further comprising:

capturing, by the processing system, a group of images of the person while the person is viewing the modified advertising content;

determining, by the processing system, eye movement of the person and a direction of view according to image pattern recognition applied to the group of images; and determining, by the processing system, an area of interest of the modified advertising content that is determined to be of interest to the person according to the eye movement and the direction of view.

13. The method of claim 10, further comprising:

capturing, by the processing system, an image of the person;

detecting, by the processing system, from the image of the person a gesture of the person, and wherein the displaying the first portion of the modified advertising content is based on the detecting the gesture by the person.

14. The method of claim 10, wherein the modified advertising content comprises interactive content that is user adjustable based on detected user gestures and an invitation for the person to utilize the communication device to contact an advertising server for further information concerning the advertising content according to an advertising objective.

15. A non-transitory machine-readable storage medium, comprising executable instructions that, when executed by a processing system including a processor, facilitate performance of operations, comprising:

displaying advertising content on a display device on a premises;

determining, using at least one sensor of a plurality of sensors, a presence of a person on the premises;

providing a software application to a communication device of the person on the premises;

querying the software application on the communication device to determine an identity of the person, wherein the communication device provides an identifying characteristic of the person responsive to the querying;

determining, using the at least one sensor, which of a plurality of zones the person occupies on the premises, wherein the plurality of zones are defined at least in part based on distances from the display device on the premises;

capturing an image of the person;

comparing the image of the person to a plurality of previously captured images;

recognizing the person by the comparing the image of the person to the plurality of previously captured images;

modifying the advertising content according to information associated with the person;

determining modified advertising content responsive to the recognizing the person by the comparing the image, responsive to detecting the person moving between the plurality of zones, and responsive to the identifying characteristic of the person;

displaying a first portion of the modified advertising content on the display device;

determining a code associated with an offer, wherein the offer is tailored to the person according to the identifying characteristic of the person;

presenting the code associated with the offer on the display device; and communicating a second portion of the modified advertising content to the communication device.

16. The non-transitory machine-readable storage medium of claim 15, wherein the communicating the second portion of the modified advertising content to the communication device comprises sending an advertising offer to the communication device based on the identifying characteristic and according to an advertising objective.

17. The non-transitory machine-readable storage medium of claim 15, wherein the determining the modified advertising content comprises enlarging the advertising content based on a distance between the person and the display device.

18. The non-transitory machine-readable storage medium of claim 15, wherein the operations further comprise:

capturing an image of the person;

determining a gesture of the person based on the image of the person, and wherein the determining the modified advertising content is based on the determining the gesture by the person.

19. The non-transitory machine-readable storage medium of claim 15, wherein the modified advertising content comprises interactive content that is user adjustable based on detected user gestures and an invitation for the person to utilize communication equipment to contact an advertising server for further information concerning the advertising content according to an advertising objective.

20. The non-transitory machine-readable storage medium of claim 15, wherein operations further comprise:

capturing a group of images of the person while the person is viewing the modified advertising content;

determining eye movement of the person and a direction of view according to image pattern recognition applied to the group of images; and determining an area of interest of the modified advertising content that is determined to be of interest to the person according to the eye movement and the direction of view.

* * * * *